UNITED STATES PATENT OFFICE.

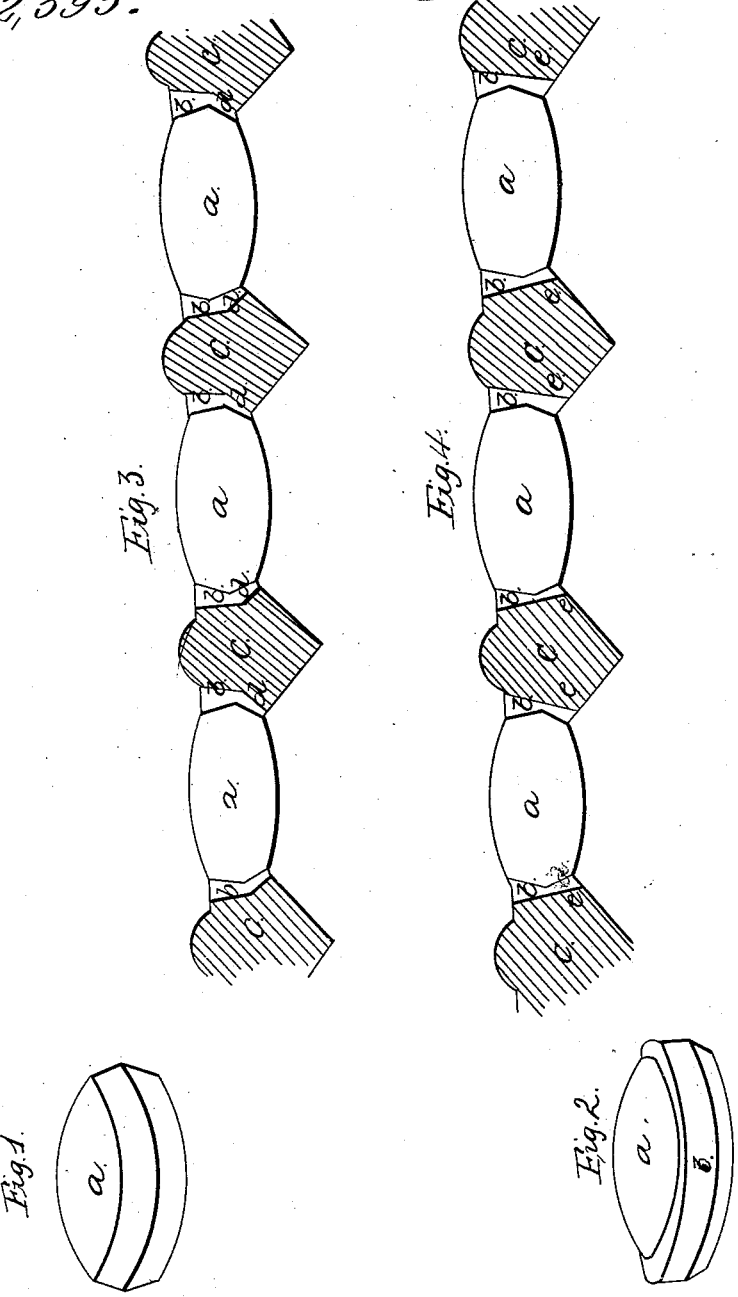

THADDEUS HYATT, OF NEW YORK, N. Y.

ILLUMINATING VAULT-COVERS.

Specification of Letters Patent No. 12,595, dated March 27, 1855.

*To all whom it may concern:*

Be it known that I, THADDEUS HYATT, of the city, county, and State of New York, and a citizen of the United States, have invented a new and useful Improvement in the Mode of Securing Glass in Illuminating Vault Covers, Plates, or other Surfaces, reference being had to the accompanying drawings, making part of this specification, in which—

Figure 1 represents a glass lens. Fig. 2 represents the glass lens surrounded by its hoop; and Figs. 3 and 4 sections of a plate with the glass lenses inserted.

The same letters indicate like parts in all the figures.

In the modes of securing glass in vault covers, plates, &c., as heretofore practised by me, the glass was secured in its seat by mastic inserted around and between the edge of the glass and the rabbet in the plate. To do this it was necessary to introduce such mastic either in the fluid or plastic state and permit it to set or solidify, which was attended with serious inconvenience; and besides, most of the mastics or cements, and generally such as become very hard in setting, contract and produce imperfect joints which are liable to leak.

The object of my invention is to secure the glass in its place so as to avoid these inconveniences; and to effect this, the nature of my invention consists in surrounding the glass with a belt or hoop of some yielding substance, such as lead, gutta percha, or other equivalent substance, which, together with the glass which it surrounds, can be driven or forced into the aperture prepared for it, whether such aperture be cast or made in a plate or surface, so that by so driving it in, the surrounding belt or hoop will become compressed, and thus effectually secure the glass, and insure a tight water tight joint.

In the accompanying drawings (*a*) represents a glass lens of the form which I prefer for the purpose, and which represents two frustrums of cones united at their bases so as to obtain a greater circumference in the middle of the thickness. On this I cast a hoop or belt of lead (*b*) by placing the glass in a suitable mold. The outer periphery of this hoop or belt I prefer to make cylindrical or nearly so, and slightly beveled at the lower edge for facility of insertion. The holes or apertures in the plate (*c*) or surface, may be made in the form of a rabbet as at (*d*) or slightly conical as at (*e*) or of any other suitable form to give a support to the glass when inserted. After the glass has been thus surrounded, it is inserted in the hole and forced or driven in by applying the requisite force to the upper edge of the belt or hoop, which has the effect of completely securing a water tight joint; for the belt or hoop being made of a yielding substance, its outer circumference will conform itself to the form of the aperture, whilst its inner circumference will continue in contact with the periphery of the glass.

From the foregoing it will be seen that whatever may be the form of the glass or of the aperture, the belt or hoop will yield and adapt itself to both, and in this way effectually secure the one within the other without the danger of leaks; and that this can be done and completed at once, without the necessity and inconvenience of waiting; or the danger of contraction in setting such as would be experienced in the use of mastics or cements. And besides all this, the yielding property of the substance constituting the hoop or belt which enables it to adapt itself to the form of the surfaces, will also enable it to yield sufficiently to the expansion and contraction due to changes of temperature, to prevent breakage.

I have thus described the mode which I have tried with success; but it will be obvious that instead of casting the hoop on the glass, it may be wrapped around it, which is the best mode of procedure when gutta percha or other like substances are used instead of lead. I would however, remark, that when I use gutta percha or other substances of that nature, I contemplate applying the hoop to the glass while the substance is in the plastic state; but this I only contemplate doing when the glass varies much from the cylindrical form.

When glasses are thus inserted, it will be seen that they can be readily taken out whenever it becomes necessary to renew them, and that if at any time they become loose, by the application of the requisite force or percussion, they can be rendered perfectly tight.

Having thus described the character of my invention, and the mode of application which I have tried with success, and pointed out some of the modifications which I have contemplated, I wish it to be distinctly understood that I do not limit myself to the mode or modes thus specified, but to cover all merely formal variations.

I am aware that before my invention glass has been secured in lead sashes by inserting the glass in a rabbet and then lapping or bending the lead over the surface of the glass. And I am also aware that jewelers have secured gems or precious stones in a case of one kind of metal and then secured this case in a socket made in a ring or other article to be ornamented by soldering or brazing such metal case in the said socket of the ring or other article (and sometimes without this) and then lapping or bending the metal of the socket over the edge of the case and gem; but none of these modes hold the glass by forcing the glass with its surrounding ring made of soft yielding metal, or equivalent therefor, within the cavity of a hard metal case to hold it therein solely by the pressure due to the force with which it is driven in, that the entire upper surface of the glass may be exposed to the light and to insure perfect contact of the joints to prevent leaks. And therefore I do not wish to be understood as making claim broadly to the securing of glass directly within a soft metal sash, nor to the securing of glass within a metal case to be in turn secured within a metal socket, as these have been known when applied as herein specified.

What I claim as my invention, and desire to secure by Letters Patent, is—

The method of securing glasses in the apertures of metal plates or other surfaces, by surrounding the glass with a hoop or belt of lead, gutta-percha, or other equivalent yielding substance, and forcing the glass so surrounded into the aperture or recess, substantially as, and for the purpose specified.

THADDEUS HYATT.

Witnesses:
HOMER BROWN,
W. W. HYATT.